May 7, 1935.  E. E. ARNOLD  2,000,735
VALVE STRUCTURE FOR COMPRESSORS AND PUMPS
Filed May 8, 1933
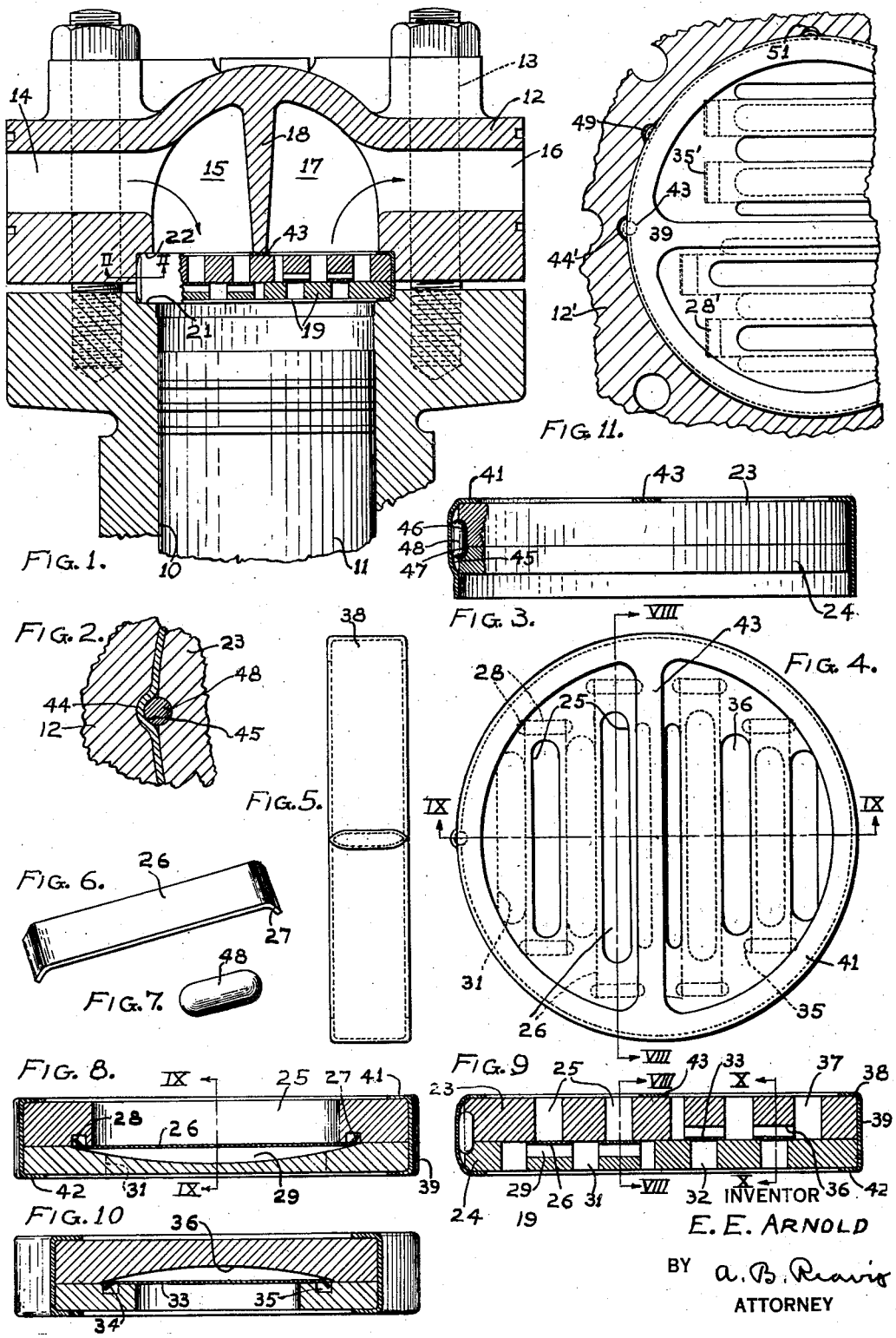
INVENTOR
E. E. ARNOLD
BY a. B. Reavis
ATTORNEY Patented May 7, 1935

2,000,735

UNITED STATES PATENT OFFICE 2,000,735

VALVE STRUCTURE FOR COMPRESSORS AND PUMPS

Edwin E. Arnold, Pittsburgh, Pa., assignor to Westinghouse Electric & Manufacturing Company, East Pittsburgh, Pa., a corporation of Pennsylvania Application May 8, 1933, Serial No. 670,015

17 Claims. (Cl. 230—231)

My invention relates to compressors and pumps, more particularly to a valve structure therefor, and it has for an object to provide an improved valve structure.

A further object is to provide a valve structure which may be produced by simple machining operations.

A particular object is to provide improved gasket means for the value structure.

A further object is to facilitate assembling of the valve structure.

A further object is to provide means which permits the parts of the valve structure to be assembled only in their proper relation, and which facilitates assembling thereof in such relation.

Another object is to provide a unit assembly of the valve structure.

In accordance with my invention, I provide a valve structure which may comprise a plurality of plates or discs arranged in face-to-face relation. One valve plate is formed with a port and its abutting surface constitutes the valve seat. The movable valve member comprises a flexible valve strip positioned between the valve plates.

The valve members are partially encased in a gasket sheath, which includes a cylindrical or similar portion encompassing the peripheries of the plates and inturned flanges engaging the outer or remote faces of the plates, thereby uniting the valve structure into a unit assembly. The flanges provide gaskets between the group of plates and the adjacent parts of the compressor or pump between which the plates are secured, while the cylindrical or similar portion seals the abutting faces of the plates from the exterior.

Where the cylinder head has a partition between the inlet and exhaust compartments, the adjacent flange is provided with an integral cross strip providing a gasket between the partition and the adjacent face of the valve plate.

To assure assembly in proper relation, the cylindrical portion of the gasket sheath is pressed outwardly at one point forming a recess on the inner side and a projection on the outer side. The peripheries of the several valve plates are formed with recesses registering with the recess in the gasket sheath, and a key or pin fits into the several recesses. The projection fits into a recess of the cylinder head, assuring proper relation of the valve parts. The gasket sheath may be formed with two additional projections and the three projections spaced unequally and registering with three similarly spaced recesses in the cylinder head to prevent placing of the valve assembly in inverted position.

The above and other objects are effected by my invention as will be apparent from the following description and claims taken in connection with the accompanying drawing, in which:

Fig. 1 is a vertical sectional view showing the valve assembly embodied in a reciprocating compressor;

Fig. 2 is an enlarged detail section taken on the line II—II of Fig. 1;

Fig. 3 is an elevational view, partly in section, showing the valve structure before it is completely assembled;

Fig. 4 is a plan view of the valve assembly;

Fig. 5 is an elevational view of the valve assembly;

Fig. 6 is a perspective view of one of the flexible valve strips;

Fig. 7 is a perspective view of the interlocking key;

Fig. 8 is a sectional view taken on the line VIII—VIII of Figs. 4 and 9;

Fig. 9 is a sectional view taken on the line IX—IX of Figs. 4 and 8;

Fig. 10 is a sectional view taken on the line X—X of Fig. 9; and

Fig. 11 is a plan view, partly in elevation and partly in section, showing a modified arrangement of locking the valve assembly in the cylinder and the cylinder head.

Referring now to the drawing more in detail, I show, in Fig. 1, a portion of a reciprocating compressor in which my novel valve assembly is embodied. The compressor includes a cylinder 10 in which a piston 11 operates. A cylinder head 12 is secured to the cylinder 10 by bolts 13 and is provided with an inlet 14, an inlet chamber 15, an outlet 16, an outlet chamber 17, and a partition 18 between the inlet and outlet chambers. A valve assembly, indicated generally by the reference numeral 19 and providing both inlet and outlet valves, is clamped between the cylinder and the cylinder head by the bolts 13, the cylinder and the cylinder head being counterbored to receive the valve assembly, as shown at 21 and 22, respectively. The valve assembly is shown in section in Fig. 9 in the same position as in Fig. 1.

The valve structure comprises two discs or circular valve plates 23 and 24, which are arranged in superposed or face-to-face relation, the contacting faces having flat surfaces. Referring particularly to Figs. 8, 9, and 10, the inlet valves include elongated ports 25 in the valve plate 23 which are adapted to be closed by flexible valve strips 26. The latter have their end portions 27 bent at any suitable angle, for example, 30°, to the body of the strip, which is flat in its normal or unflexed condition. The valve plate 23 is formed with recesses 28 slightly beyond each end of the ports 25, into which the end portions 27 extend. The recesses 28 may be milled or pressed into the face of the plate. The ends of the strips 26 are adapted to abut against the remote sides of the recesses 28, whereby the strips are positioned or retained endwise when in closed position. In other words, the distance between the ends of the strips is equal to or slightly less than the distance between the remote sides of the recesses 28.

The valve plate 24 is formed with recesses 29 opposing the ports 25. Each recess 29 is formed along a single arc extended to the meeting surfaces of the valve plates, intersecting the meeting faces at the recesses 28. The recesses 29 are positioned so as to contact or nearly contact the valve strips 26 at the outer rounded corners formed by bending the end portions 27. The body portions of the valve strips 26 are received or disposed in the recesses 29, the end portions of which also serve to position the strips laterally. The valve plate 24 is also formed with ports 31 disposed between and adjacent the recesses 29 and providing communication therewith.

The discharge valves are formed similarly to the inlet valves and include elongated ports 32 in the valve plate 24, flexible valve strips 33 whose end portions 34 extend into recesses 35 in the valve plate 24 and whose body portions are disposed in recesses 36 in the valve plate 23 each curved along a single arc similarly to the recesses 29. The valve plate 23 is also formed with ports 37 between and adjacent the recesses 36.

The valve plate 23 constitutes the valve seat member and the valve plate 24 a cap or retaining member for the inlet valves, while, in the case of the outlet valves, the valve plate 24 is the valve seat member and the valve plate 23 a cap or retaining member. The arrangement of the ends of the valve strips 26 and 33 in the recesses 28 and 35, respectively, eliminates the necessity of modifying the recesses 29 and 36 to receive said ends. The recesses 29 and 36 may, therefore, be cut on a single arc by a single milling cut. Also, the valve strips 26 and 33 may be cut with straight ends.

The valve plates are secured together at their periphery by being partially encased in a gasket sheath 38, made of any suitable material, such as copper. Alternatively, the gasket sheath may be made of copper having a coating of tin or other softer material on its surface. The tin provides a more yielding surface which is desirable due to the work hardening of the copper. The gasket sheath includes a cylindrical portion 39, which encompasses the peripheries of the valve plates, and flanges 41 and 42 which engage the upper face of the valve plate 23 and the lower face of the valve plate 24, respectively, that is, the outer or remote faces of the group of valve plates. The flange 41 is formed with an integral cross strip 43 adapted to register with the partition 18 in the cylinder head.

The cylindrical portion 39 of the gasket sheath is pressed outwardly at one part of its circumference as shown, particularly in Fig. 2, thereby providing a projection 44 on the outer side of the cylindrical portion and a recess 45 on its inner side. The valve plates 23 and 24 are formed with recesses 46 and 47, which register with the recess 45 when the valve plates and the gasket sheath are in proper angular relation, that is, when the recesses 29 and the ports 32 of the valve plate 24 register with the ports 25 and the recesses 36 of the valve plate 23, and the cross strip 43 extends parallel to said recesses and ports. A key 48 is inserted in the cavity formed by the registering recesses. The counterbored portions of the cylinder and the cylinder head are also recessed as shown in Figs. 1 and 2 to receive the projection 44.

The valve structure is assembled as follows: The gasket sheath is first formed in the shape of a cup as shown in Fig. 3, the flange 41 and the connecting strip 43 being on the closed side. The sheath is inverted from the position shown in Fig. 3, the valve plate 23 is first inserted and brought to the angular position in which the recesses 46 and 45 register. The flexible valve strips 26 and 33 are placed on the valve plate 23 in their respective positions. The key 48 is then inserted into the aperture formed by the registering recesses. The valve plate 24 is then inserted, it being first turned into proper angular relation in order that the recess 47 may engage with the key 48. The marginal portion of the gasket sheath at the open side is then rolled or spun onto the adjacent face of the valve plate 24 to form the flange 42. The valve structure has now been assembled into a unit and may be handled and incorporated in the compressor as a single unit.

The valve assembly is placed in the counterbore 21 with the projection 44 entering the recess in the counterbore, and the cylinder head 12 is then positioned with the recess in its counterbore also engaging the projection 38, as shown in Fig. 2, thereby automatically bringing the partition 18 into alignment with the cross strip 43. The cylinder head is then secured to the cylinder by means of the bolts 13. In this relative position of the parts, the inlet valves communicate with the inlet chamber 15 and the discharge valves communicate with the outlet chamber 17.

The operation of the compressor is as follows: As the piston 11 moves downwardly on its suction stroke, the fluid entering through the inlet 14 and the inlet chamber 15 passes downwardly through the ports 25, deflects the flexible valve strips 26 downwardly in passing through the recesses 29 and then passes through the ports 31 to the cylinder. Upon the upward movement of the piston in its compression stroke, the fluid contained in the cylinder passes upwardly through the ports 32, deflects the flexible valve strips 33 upwardly as it passes through the recesses 36 and then passes through the ports 37 and the outlet chamber 17 to the outlet 16. During the inlet stroke the flexible valve strips 33 assume their normal flat position and are held down against the adjacent face or seat of the valve plate 24 by the higher pressure in the outlet chamber 17, and during the compression stroke, the flexible valve strips 26 are held in their normal flat position against the adjacent face or seat of the valve plate 23 by the greater pressure within the cylinder.

The flange 41 provides a gasket between the valve plates and the cylinder head, while the flange 42 provides a gasket between the valve plates and the cylinder 10. The cylindrical portion 39 provides a seal to prevent any leakage between the valve plates and the flanges 41 and 42. It will be apparent that this construction provides for an absolute minimum of possible leakage of fluid into or out of the compressor through the valve structure. Sealing is facilitated by making the sheath of copper or other relatively soft metallic material leaving adequate mechanical strength. Preferably, the copper has a coating of tin, or other softer material, on its surface. I have also found that aluminum is a desirable material for this purpose, since it flows or deforms to a suitable extent.

In Fig. 11, I show a gasket sheath 39 having three pressed-out projections 44', 49, and 51, which are unequally spaced and fit into registering recesses in the cylinder head 12' and in the cylinder. By providing three unequally spaced projections and recesses, it is impossible to position the valve assembly in inverted position. The projection 44' provides a recess on the inner side of the gasket sheath into which the key 48 fits, as in the first embodiment.

As shown in Fig. 11, recesses 28' and 35', corresponding to the recesses 28 and 35, may be formed with straight ends spaced a distance substantially equal to the width of the valve strips 26 and 33, and serving to position said strips laterally as well as endwise.

From the above description, it will be seen that I have provided a valve structure which is simple to manufacture, which can be assembled only in proper relation of parts, which is formed into a separately removable unit, and in which a minimum of leakage is assured.

While I have shown my invention as embodied in valves of the so-called feather valve type, it is to be understood that the assembly features of my invention are not so limited but may be applied to any valve structure having a plurality of plate or flat members arranged in face-to-face relation. It is also to be understood that the invention is not limited, except to claims directed thereto, to placing the valve assembly between the cylinder and the cylinder head.

While I have shown my invention in two forms, it will be obvious to those skilled in the art that it is not so limited, but is susceptible of various other changes and modifications without departing from the spirit thereof, and I desire, therefore, that only such limitations shall be placed thereupon as are imposed by the prior art or as are specifically set forth in the appended claims.

What I claim is:—

1. In a valve structure for a compressor or pump, a valve assembly adapted to be clamped between the cylinder and the cylinder head of the compressor or pump, said valve assembly comprising a plurality of valve plates arranged in face-to-face relation and a gasket sheath encompassing the peripheries of said valve plates and having flanges turned in against the outer faces of the valve plates to form gaskets between said outer faces and the cylinder and the cylinder head, respectively.

2. A unit valve assembly, adapted to be secured between parts of fluid translating apparatus, comprising two valve plates in face-to-face relation, said plates having ports therein, movable valve members retained between said valve plates for controlling flow of fluid through said ports, and a gasket sheath encompassing the peripheries and covering the marginal portions of the remote faces of the valve plates, the parts of the valve assembly being secured by said gasket sheath into a single removable unit.

3. In a compressor or pump, a valve assembly adapted to be secured between the cylinder and the cylinder head comprising a plurality of disc members and a gasket sheath encompassing the peripheries of the disc members and covering the marginal portions of the remote faces of the disc members, said gasket sheath serving to secure the parts of the valve assembly together into a single removable unit.

4. In a valve structure for a compressor or pump, a valve assembly adapted to be secured between the cylinder and the cylinder head of the compressor or pump, said valve assembly comprising a plurality of valve discs in face-to-face and predetermined angular relation, a gasket sheath having a cylindrical portion encompassing the peripheries of said valve discs and inturned flanges forming gaskets between the valve assembly and the cylinder and the cylinder head, respectively, said valve discs having registering recesses in their peripheries, and a key extending into both recesses for maintaining said valve discs in said predetermined angular relation.

5. In a valve structure for a compressor or pump, a valve assembly adapted to be secured between the cylinder and the cylinder head of the compressor or pump, said valve assembly comprising a plurality of valve discs arranged flatwise against each other in predetermined angular relation, a gasket sheath having a cylindrical portion encompassing the peripheries of said valve discs and flanges extending inwardly against the outer or remote faces of the valve discs to form gasket seats therefor, said valve discs and cylindrical portion having recesses registering to form a single cavity, and a key in said cavity maintaining the valve discs in said predetermined angular relation.

6. A valve assembly for a compressor comprising a cylinder and a cylinder head having an inlet chamber, an exhaust chamber and a partition separating said chambers, said valve assembly being adapted to be secured between the cylinder and the cylinder head and comprising a plurality of valve plates arranged in face-to-face relation and a gasket sheath, said gasket sheath having a portion encompassing the peripheries of said valve plates, flanges extending inwardly against the outer or remote faces of the valve plates to form gaskets bearing against the cylinder and the cylinder head, respectively, and a portion registering with said partition in the cylinder head and providing a gasket between said partition and the adjacent face of the valve plate.

7. A valve assembly for a compressor, comprising a cylinder and a cylinder head having an inlet chamber, an exhaust chamber, and a partition separating said chambers, said valve assembly being adapted to be secured between the cylinder and the cylinder head and comprising a plurality of valve discs arranged flatwise against each other in predetermined angular relation, and a gasket sheath, said gasket sheath having a cylindrical portion encompassing the peripheries of said valve discs, flanges extending inwardly against the outer or remote faces of the valve discs to form gaskets bearing against the cylinder and cylinder head, respectively, and a cross strip integral with one of the flanges and registering with said partition in the cylinder head to provide a gasket between said partition and the adjacent face of the valve disc, said valve discs and cylindrical portion of the gasket sheath being formed with recesses which register to form a single cavity, and a key in said cavity for maintaining the valve discs and the gasket sheath in predetermined angular relation.

8. In a compressor, the combination of a cylinder, a cylinder head having a counterbore, an inlet chamber, an exhaust chamber and a partition separating said chambers, and a valve assembly adapted to fit in said counterbore and to be secured between the cylinder and the cylinder head, said valve assembly comprising a plurality of valve discs arranged in predetermined angular face-to-face relation and a gasket sheath, said gasket sheath having a cylindrical portion encompassing the peripheries of said valve discs, flanges extending inwardly against the outer or remote faces of the valve discs to form gaskets bearing against the cylinder and the cylinder head, respectively, and a cross strip integral with one flange and registering with said partition in the cylinder head to provide a gasket between said partition and the adjacent face of the valve disc, said cylindrical portion being pressed outwardly at one point to provide a projection on its outer side and a recess in its inner side, said valve discs having recesses registering with the recess in the cylindrical portion, and a key inserted in said registering recesses to mantain said valve disc in predetermined relation to the gasket sheath, said cylinder head having a recess adjacent the counterbore engaging the projection on the outer side of the cylindrical portion for maintaining the valve assembly in predetermined angular relation to the cylinder head.

9. The combination defined in claim 8 wherein said cylindrical portion is provided with two additional projections on its outer side, the three projections being unequally spaced, and wherein the cylinder head has two additional recesses registering with the additional projections, whereby assembling of the valve assembly in inverted position is prevented.

10. A valve comprising a seat member having a substantially flat surface on one side forming a flat valve seat, a port through said valve seat and recesses on opposite sides of the port, a cap member having a flat surface contacting with the first-mentioned flat surface and a recess disposed opposite said port and formed entirely along a single arc extending to the flat surface of the cap member, and a flexible valve strip having its end portions bent to extend into the first-mentioned recesses and bearing against the remote sides thereof when the body of the strip is in closed position flat against said valve seat.

11. A gasket sheath for a valve plate adapted to be secured between a cylinder and a cylinder head having a partition extending to the valve plate, said gasket sheath comprising a short tubular portion adapted to encompass said valve plate, an inturned flange at one edge of the tubular portion providing a seal between the valve plate and the cylinder head, a transverse strip providing a seal between the valve plate and said partition and an edge portion at the opposite edge of said tubular portion for providing a seal between the valve plate and said cylinder.

12. A valve assembly adapted to be secured to a member for controlling the flow of fluid through an opening in said member, said valve assembly comprising a plurality of valve parts, and a common member of suitable material providing a gasket between the abutting surfaces of the valve assembly and said member and securing said valve parts together into removable unitary structure.

13. A unit valve assembly comprising a plurality of substantially flat valve members and a sheath encompassing the peripheries of said valve members and securing said valve members together to provide a valve unit, said sheath having a flange extending inwardly against the outer face of one of said valve members to form a gasket.

14. A valve assembly adapted to be secured between the cylinder and the cylinder head of a compressor or pump, said valve assembly comprising a plurality of valve parts, and a common member of suitable material providing gaskets between the abutting surfaces of the valve assembly and the cylinder and of the valve assembly and the cylinder head and securing the parts of said valve assembly together into a removable unit.

15. A valve assembly adapted to be secured between two members, said valve assembly comprising a plurality of valve parts and a gasket sheath encompassing said valve parts to secure the same together into a removable unit, said gasket sheath also forming a gasket between abutting surfaces of the valve assembly and said two members between which the valve assembly is secured.

16. In a valve structure for a compressor or pump, a valve assembly adapted to be secured between the cylinder and the cylinder head of the compressor or pump, said valve assembly comprising a plurality of valve discs in face-to-face and predetermined angular relation, a gasket sheath having a cylindrical portion encompassing the peripheries of said valve discs and inturned flanges forming gaskets between the valve assembly and the cylinder and the cylinder head, respectively, and means at least partly formed in said gasket sheath for maintaining said valve discs in said predetermined angular relation.

17. In a valve assembly, the combination of a plurality of cooperating valve discs in face-to-face relation, a sheath encompassing the peripheries of said valve discs and having flanges engaging the discs to secure the valve assembly into a unit, and means formed at least partly in said sheath for maintaining said discs in predetermined angular relation.

EDWIN E. ARNOLD.